V. W. HARMON.
TANK OUTFLOW.
APPLICATION FILED DEC. 29, 1913.
1,101,073.
Patented June 23, 1914.
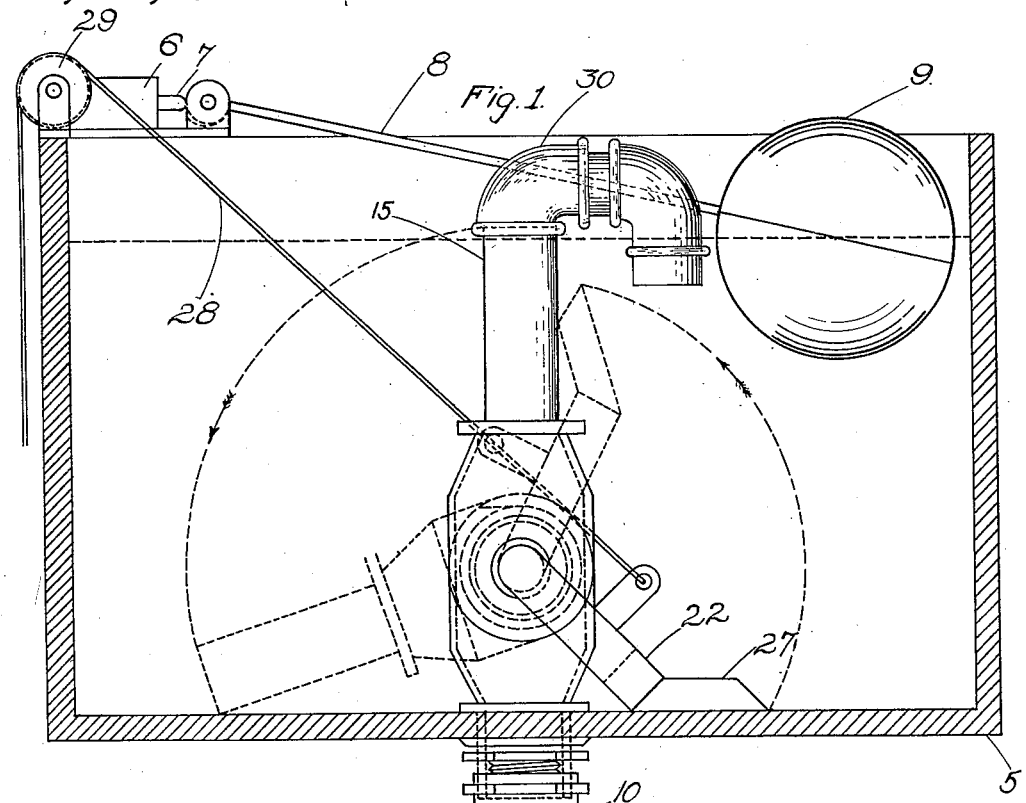
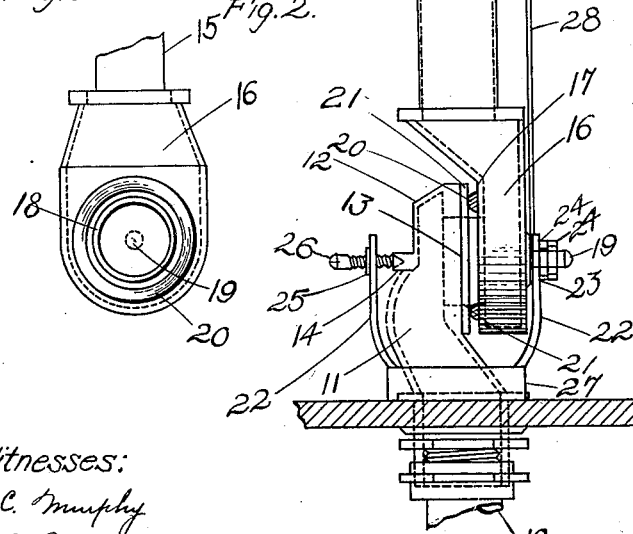
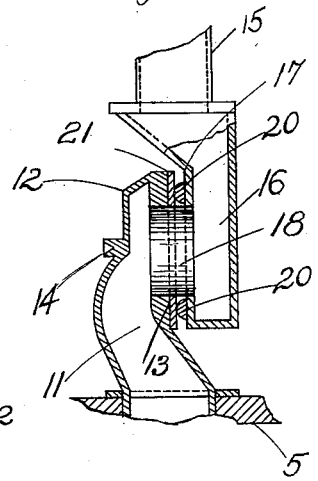
Witnesses:
E. C. Murphy
F. C. Curren.
Inventor,
Vinal W. Harmon
By Henry J. Miller
atty.

UNITED STATES PATENT OFFICE.

VINAL W. HARMON, OF DORCHESTER, MASSACHUSETTS.

TANK-OUTFLOW.

1,101,073.  Specification of Letters Patent.  Patented June 23, 1914.

Application filed December 29, 1913. Serial No. 809,174.

*To all whom it may concern:*

Be it known that I, VINAL W. HARMON, a citizen of the United States, residing at Dorchester, in the county of Suffolk and State of Massachusetts, have invented certain new and useful Tank-Outflows, of which the following is a specification, reference being had to the accompanying drawings, forming part thereof.

This invention has reference to improvements in devices for controlling the outflow of water from tanks.

One object of the invention is to so construct an outflow for toilet and other tanks that opportunity for leakage is reduced to a minimum and that said outflow device may be automatically positioned to control the height of water in the tank.

Another object of the invention is to so construct an outflow of the nature described that the escape of water therethrough may be comparatively noiseless.

Other objects of the invention will appear from the following description.

The invention consists in certain novel features of construction and combination of parts as shall hereinafter be more fully described and pointed out in the claims.

Figure 1, represents a vertical sectional view of a tank having the improved outflow device. Fig. 2, represents a view of portions of the same taken at right angles to Fig. 1. Fig. 3, represents a face view of the outflow chamber or valve. Fig. 4, represents a view similar to Fig. 3, of parts of the outflow, portions thereof being broken away.

Similar reference characters designate corresponding parts throughout.

As shown in the drawings in its preferred form 5 represents any ordinary tank in which water may be stored for use. This tank 5 is provided with the usual inflow or supply valve casing 6 having any ordinary valve of which the stem 7 is adapted to be operated in the closing direction by means of the rod 8 having the float 9.

Mounted in an opening in the bottom of tank 5 is the outlet pipe 10 which is suitably secured in place to prevent leakage between its wall and the opening through which it extends. The upper portion of said outlet pipe forms the chamber 11 having the hood 12 the vertical face 13 of which has an opening and located on said hood 12 in alinement with the axis of said opening is the bearing 14. The outflow and overflow pipe 15 is in the nature of a valve in that it controls the outflow of water through the opening in the face 13 of hood 12. For such purpose the lower portion of pipe 15 is preferably flattened somewhat to form the chamber 16 which preferably is offset from the axis of pipe 15 to provide the vertical face 17 from which the tube or collar 18 extends laterally while the wall of chamber 16 is furnished with the stud 19 extending in line with the axis of said collar 18. The face 17 of chamber 16 has the annular bearing rib 20 outside of which, on collar 18, is mounted the packing 21. When the parts are assembled as shown in the drawings said collar 18 extends into the opening in the face 13 of hood 12 and is journaled in said opening so that the outflow pipe 15 may swing on an axis indicated by the positions of bearing 14 or hood 12 and stud 19 of chamber 16.

Provision is made to prevent the separation of chamber 16 from hood 12, while permitting the swinging of said chamber 16 and its pipe 15. Such provision is the yoke 22 the arm 23 of which is engaged with stud 19 and is secured to said stud by nuts 24, and arm 25 of this yoke has the pin 26 which is engaged with the bearing 14. The yoke 22 has the weight 27 which is in the nature of a stop as its movement, in effecting the swinging of the outflow pipe 15 to its upright position, is adapted to be arrested by the bottom of tank 5 or other fixed part. The weighted end of yoke 22 is swung upward and the upper portion of outlet pipe is correspondingly swung downward by means of the cable or cord 28 which is attached to a member of said yoke and extends over the sheave 29 and then to a point convenient for use. In the swinging movement of pipe 15 and chamber 16 relative to chamber 11, as at other times, the action or pressure of the arms 23 and 25 is to hold the packing 21 in contact between the bearing rib 20 of chamber 16 and the face 13 of hood 12 to form a water tight joint and as these parts are not subjected to any undue wear practically no leakage can occur.

In order to assist in the formation of a vacuum in pipe 15 and chambers 16 and 11 I prefer to supply the upper or outer end of pipe 15 with the return pipe 30 which may be of any suitable length and shape, but this return pipe 30 or any part thereof may be omitted without necessarily changing my invention.

When the cable 28 is operated to swing upward yoke 22 the outlet pipe 15 and its chamber 16 are caused to swing correspondingly downward and the tendency of such motion of the open end of pipe 15 passing through the water in tank 5 is to create a vacuum within the pipe 15 which tends to draw water from said tank inward through the open end of pipe 15 or through said return pipe 30 if such return pipe is used.

In actual use it is found that this outflow device operates without noise caused in other outflows by the suction of the water.

Having thus described my invention I claim as new and desire to secure by Letters Patent—

1. A tank outflow comprising an outflow pipe having a vertical face furnished with an opening, an overflow pipe having at its lower end a chamber having a laterally extending collar journaled in said opening of the outflow pipe, a yoke mounted to swing about the axis of said collar and its opening said yoke having a weight, and means for operating said yoke to effect the swinging of said overflow pipe.

2. A tank outflow comprising an outflow pipe, the upper end of which has a vertical face having an opening, an inlet pipe for said outflow having a collar journaled in said opening and a bearing rib embracing said collar, packing on said collar between said rib and said outflow pipe, and a yoke having one end mounted to swing on said outflow pipe at the axis of said opening, and the other end secured to said inlet pipe.

VINAL W. HARMON.

Witnesses:
HENRY J. MILLER,
ESTHER C. MURPHY.

---

Copies of this patent may be obtained for five cents each, by addressing the "Commissioner of Patents, Washington, D. C."